United States Patent
Lawrence et al.

(10) Patent No.: US 6,713,716 B1
(45) Date of Patent: Mar. 30, 2004

(54) REDUCED MIST LASER SHOCK PEENING

(75) Inventors: Wayne Lee Lawrence, Sardinia, OH (US); Paul Michael Perozek, Cincinnatti, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/448,966

(22) Filed: May 30, 2003

(51) Int. Cl.$^7$ .............................................. B23K 26/00
(52) U.S. Cl. .............................. 219/121.68; 219/121.86
(58) Field of Search ........................ 219/121.6, 121.68, 219/121.69, 121.84, 121.85, 121.86

(56) References Cited

U.S. PATENT DOCUMENTS

| | | | | |
|---|---|---|---|---|
| 6,197,133 B1 | * | 3/2001 | Unternahrer et al. | 148/525 |
| 6,259,055 B1 | * | 7/2001 | Sokol et al. | 219/121.68 |
| 6,359,257 B1 | * | 3/2002 | Clauer et al. | 219/121.84 |
| 6,373,876 B1 | * | 4/2002 | Dulaney et al. | 372/98 |

* cited by examiner

Primary Examiner—Samuel M. Heinrich
(74) Attorney, Agent, or Firm—V G Ramaswamy; Steven J. Rosen

(57) ABSTRACT

A laser unit includes a laser beam source for generating a laser beam along a laser beam centerline. A beam tube surrounds at least a portion of the beam centerline. A beam aperture is located at an exit of the tube. A final beam optical lens is mounted within the tube upstream of the aperture. A gas purging means flows purge gas into the tube between the lens and the aperture. A converging section of the tube is located between the lens and the aperture. At least one telescoping section in the tube is located between the lens and the aperture in the converging section of the tube. The lens has a focal number less than 8 and may be less than 7 and down to about 5. A gas knife located between the aperture and the focal point of the lens is used for flowing a large volume of clearing gas across the laser beam between the aperture and the focal point.

55 Claims, 4 Drawing Sheets

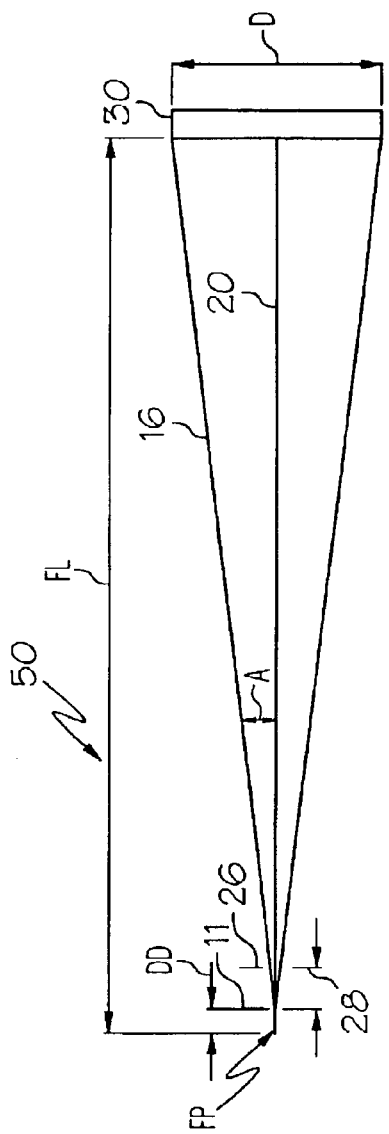
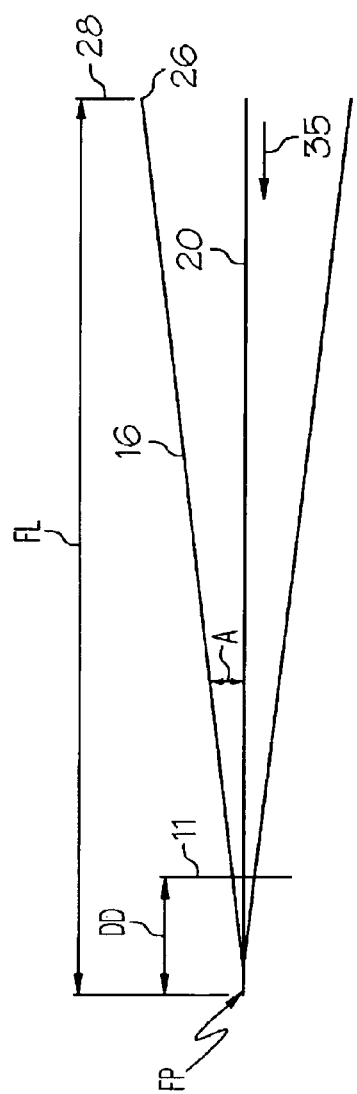
FIG. 4
FIG. 5

REDUCED MIST LASER SHOCK PEENING

BACKGROUND OF THE INVENTION

1. Field of the Invention

This invention relates to laser shock peening an article and, more particularly, to apparatus and methods for minimizing mist between a laser shock peening laser and the article.

2. Description of Related Art

Laser shock peening or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shock wave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by an instantaneous ablation or vaporization of a thin layer of that surface or of a coating (such as tape or paint) on that surface which forms a plasma.

Laser shock peening is being developed for many applications in the gas turbine engine field, some of which are disclosed in the following U.S. Pat. No. : 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

Laser peening has been utilized to create a compressively stressed protective layer at the outer surface of an article which is known to considerably increase the resistance of the article to fatigue failure as disclosed in U.S. Pat. No. 4,937,421 entitled "Laser Peening System and Method". These methods typically employ a curtain of water flowed over the article or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shockwaves into the bulk of the material of a component being LSP'D, to create the beneficial compressive residual stresses.

The pressure pulse from the rapidly expanding plasma imparts a traveling shock wave into the component. This compressive shock wave caused by the laser pulse results in deep plastic compressive strains in the component. Laser shock peening is typically performed in a cell or chamber including an enclosure which has walls. Vapors and a mist are produced by the laser shock peening process and fill the chamber. Mist from preceding laser beam shots produce a local mist that reduces the efficiency and power of the beam hitting the laser shock peened surface of the article being laser shock peened. This mist also causes the successive shots to bloom which also interferes with the laser shock peening process thereby reducing the efficacy of each successive laser beam shot. The vapors and mist also cause ionization of the laser beam before it reaches the target area or laser shock peening area on the article or work piece.

High energy laser beams, from about 20 to about 50 joules, or low energy laser beams, from about 3 to about 10 joules, have been used and other levels are contemplated. See, for example, U.S. Pat. No. 5,674,329 (Mannava et al.), issued Oct. 7, 1997 (LSP process using high energy lasers) and U.S. Pat. No. 5,932,120 (Mannava et al.), issued Aug. 3, 1999 (LSP process using low energy lasers). The combination of the energy of the laser and the size of the laser beam provides an energy density or fluence that is usually about 200 J/cm$^2$. Laser shock peened spots are typically formed in overlapping rows of overlapping spots. Typically, overlaps of about 30% of diameters between both spots in a row and between spots in adjacent rows are used. The laser shock peened spots and laser beams are typically circular in shape but may have other shapes such as oval or elliptical (see U.S. Pat. No. 6,541,733, entitled "Laser Shock Peening Integrally Bladed Rotor Blade Edges" by Mannava, et al., issued Apr. 1, 2003.

It is highly desirable to have a laser shock peening apparatus that reduces mist and vapors in a laser shock peening area. It is also desirable to have a laser shock peening apparatus that reduces or prevents ionization of the laser beam before it reaches the target area or laser shock peening area on the article or work piece.

SUMMARY OF THE INVENTION

A laser shock peening apparatus includes a laser unit having a laser beam source for generating a laser beam along a laser beam centerline, a beam tube surrounding at least a portion of the beam centerline, and a beam aperture located at an exit of the beam tube. An exemplary embodiment of the apparatus includes a final beam optical lens mounted within the beam tube upstream of the aperture. A gas purging means flows purge gas into the tube between the final beam optical lens and the aperture. One exemplary embodiment of the gas purging means includes a purge gas inlet disposed though the tube between the final beam optical lens and the aperture and a purge gas supply hooked up to the purge gas inlet. Two particularly useful types of the purge gas are air and Nitrogen.

A converging section of the tube is located between the final beam optical lens and the aperture. The tube converges in a downstream direction from the final beam optical lens towards the aperture. The exemplary embodiment of the apparatus further includes at least one telescoping section in the tube between the final beam optical lens and the aperture and, in a more particular embodiment, the telescoping section is in the converging section of the beam tube.

In the exemplary embodiment of the apparatus, the final beam optical lens has a focal number less than 8, the focal number being defined as a ratio of a focal length of the final beam optical lens to a diameter of the lens. The final beam optical lens has a focal point located past the beam aperture outside of the beam tube. In more particular embodiments of the apparatus, the focal number less than 7 or about 5.

The exemplary embodiment of the apparatus further includes a gas knife located between the aperture and the focal point of the lens. The gas knife is used for flowing a large volume of clearing gas across the laser beam between the aperture and the focal point.

The exemplary embodiment of the apparatus is used in conjunction with a laser shock peening cell having an enclosure and a laser shock peening area within the enclosure. The beam tube and the gas knife are disposed within the enclosure while the laser beam source may be located outside of the enclosure. A fluid nozzle is located proximate to and directed towards the laser shock peening area. A drain catch is located within the enclosure under the laser shock peening area and a fluid receptacle, such as a tank, is located outside the enclosure. A vacuum line leads from the drain catch to the fluid receptacle for draining liquid runoff from the fluid nozzle in the open drain catch into the fluid receptacle.

The laser shock peening apparatus reduces mist and vapors in a laser shock peening area and reduces or eliminates ionization of the laser beam before it reaches the target area or laser shock peening area on the article or work piece.

BRIEF DESCRIPTION OF THE DRAWINGS

FIG. 4 is a diagrammatical illustration of a steep angle laser beam used in the reduced mist laser shock peening chamber illustrated in FIG. 1.

FIG. 5 is an enlarged view of the steep angle laser beam illustrated in FIG. 1 between a focal point of the laser beam and an aperture of the laser tube.

DETAILED DESCRIPTION OF THE INVENTION

Figure 1:
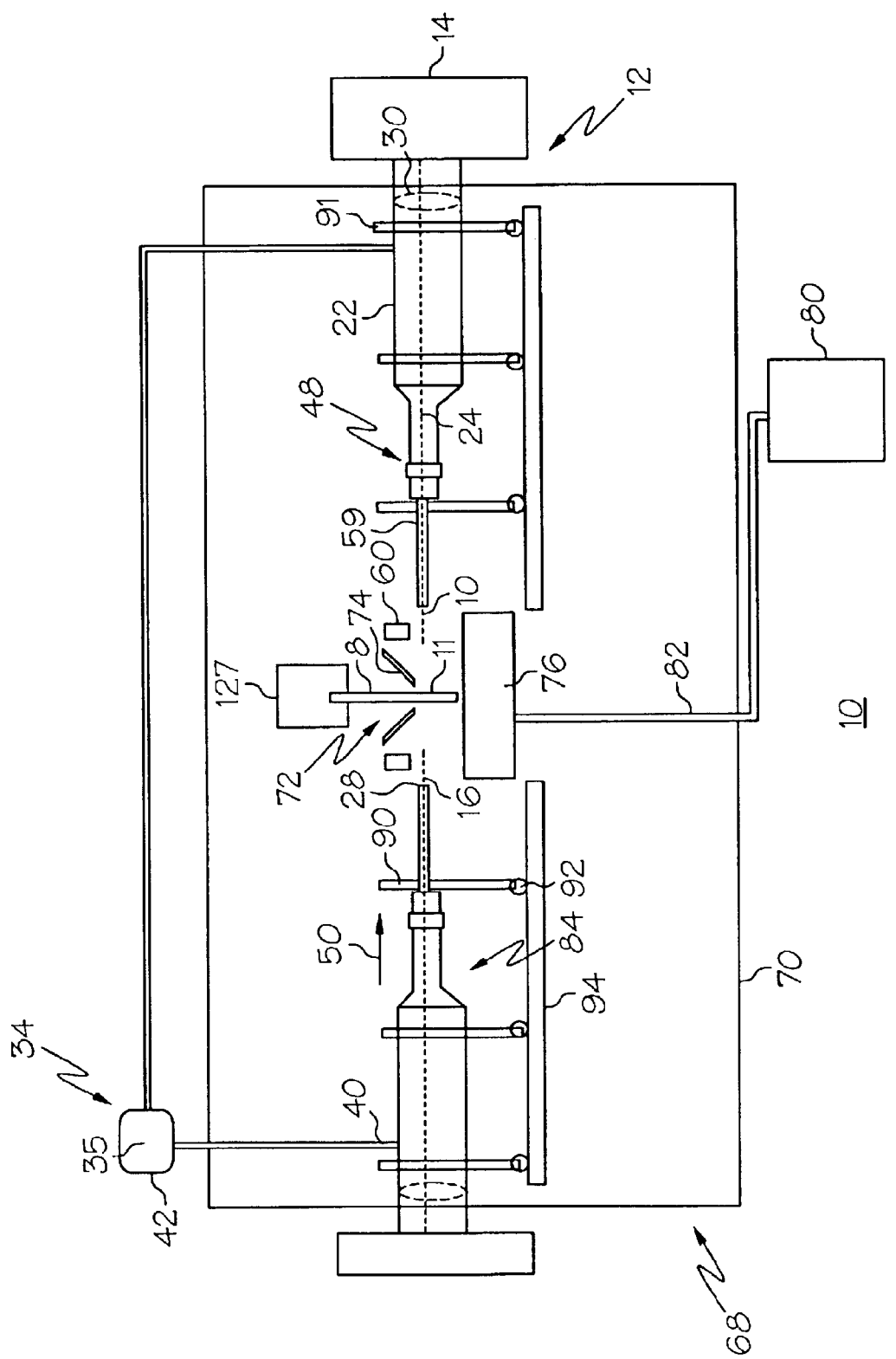
FIG. 1 is a schematical illustration of a reduced mist laser shock peening chamber.

Illustrated in FIG. 1 is an exemplary embodiment of a shock peening apparatus 10 for laser shock peening a laser shock peening surface 11 of an article or workpiece illustrated by a gas turbine engine blade 8 mounted in a multi-axis computer numerically controlled (CNC) manipulator 127. The shock peening apparatus 10 is used in conjunction with a laser shock peening cell 68 having an enclosure 70 and a laser shock peening area 72 within the enclosure. The workpiece and multi-axis computer numerically controlled (CNC) manipulator 127 are located within the enclosure 70.

The laser shock peening apparatus 10 includes a laser unit 12 having a laser beam source 14 for generating a laser beam 16 along a laser beam centerline 20. The exemplary embodiment of the cell 68 has the laser beam source 14 located outside of the enclosure 70 though it need not be. A beam tube 22 surrounds at least a portion 24 of the beam centerline 20 and is aimed to pass through a beam aperture 26 located at an exit 28 of the beam tube 22. The aperture 26 is illustrated in more detail in FIG. 2. A fluid nozzle 74 is located proximate to and directed towards the laser shock peening area 72. Typically, the fluid used is water and the fluid nozzle 74 is used to flow a curtain of flowing water onto the laser shock peening surface 11 of the workpiece as illustrated in more detail in FIG. 2.

Referring to FIG. 1, the exemplary embodiment of the apparatus includes a final beam optical lens 30 mounted within the beam tube 22 upstream of the aperture 26. A gas purging means 34 flows purge gas 35 into the tube 22 between the final beam optical lens 30 and the aperture 26. The gas purging means 34 illustrated herein includes a purge gas inlet 40 disposed though the tube 22 between the final beam optical lens 30 and the aperture 26 and a purge gas supply 42 hooked up to the purge gas inlet. Two particularly useful types of the purge gas 35 are air and Nitrogen.

Figure 3:
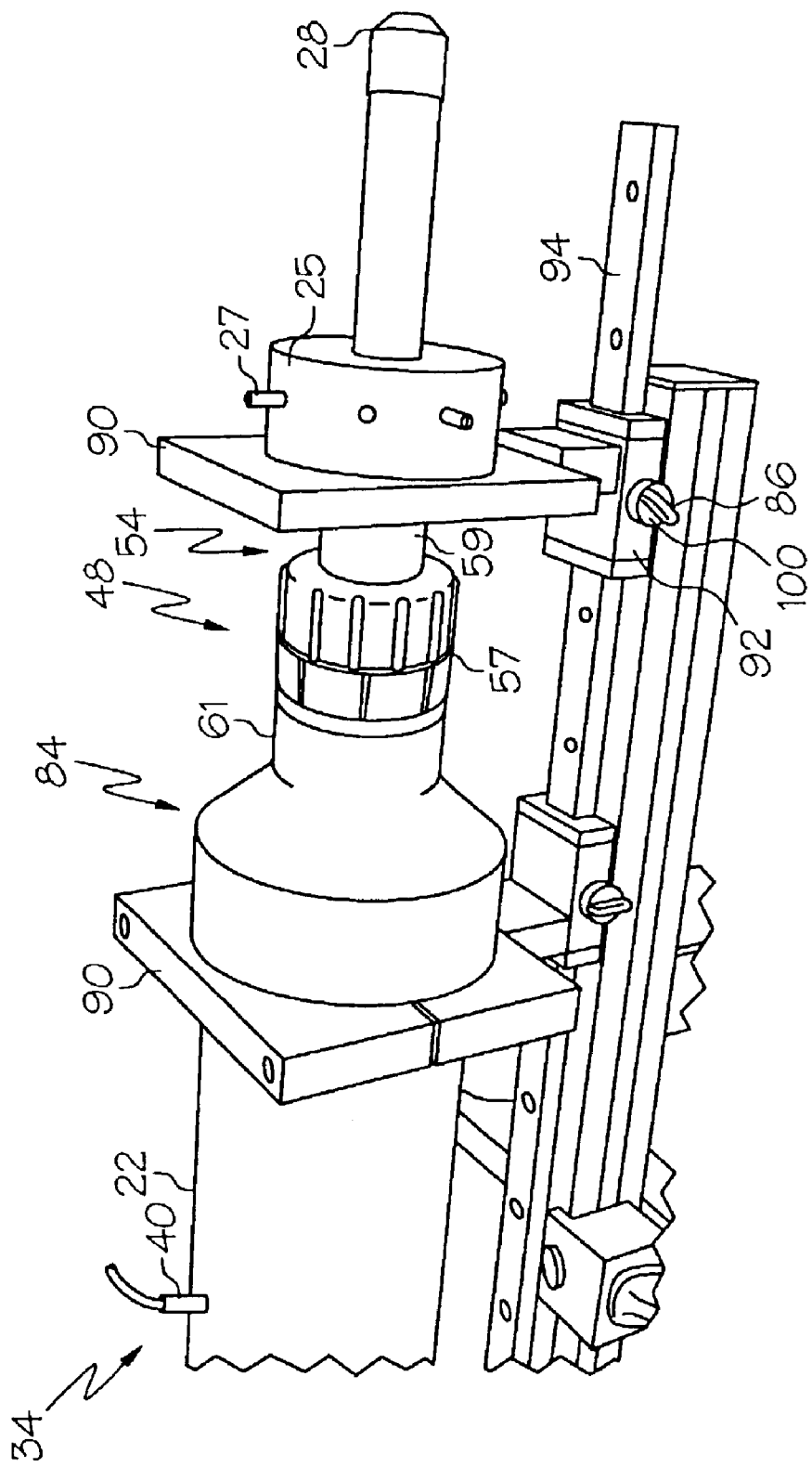
FIG. 3 is an enlarged view of a reducing and telescoping section of the laser tube illustrated in FIG. 1.

A converging section 48 of the tube 22 is located between the final beam optical lens 30 and the aperture 26. The tube converges in a downstream direction 50 from the final beam optical lens 30 towards the aperture 26. This forms an air nozzle 84 which tends to prevent blast debris and mist from the laser shock peening from entering the beam tube 22. Further referring to FIG. 3, the beam tube 22 has at least one telescoping section 54 between the final beam optical lens 30 and the aperture 26 in order to adjust the distance from the aperture to the laser shock peening area 72. The telescoping section 54 is in the converging section 48 of the beam tube 22. A telescoping knob 57 is used to adjust the tension between first and second telescoping elements 59 and 61 of the telescoping section 54. The beam tube 22 is supported within the enclosure 70 on frames 90 having adjustable slides 92 riding on rails 94. Set screws 96 having large knobs 100 for tightening are used to fix the extension of the first and second telescoping elements 59 and 61 and secure the beam tube 22 in place.

Referring to FIG. 4, a focal length FL of the laser beam 16 from the final beam optical lens 30 to a focal point FP of the laser beam 16. Typically, the laser beam 16 defocused + or − a few mils, indicted by a defocus distance DD so that the focal point FP is + or − a few mils behind or in front of laser shock peening surface 11 with respect to the final beam optical lens 30. In the exemplary embodiment of the apparatus 10, the final beam optical lens 30 has a focal number FN less than 8. The focal number is defined as a ratio of a focal length FL of the final beam optical lens 30 to a diameter D of the final beam optical lens 30. The final beam optical lens 30 has a focal point FP located past the beam aperture 26 outside of the beam tube 22. More particular embodiments of the apparatus 10 have a focal number FN less than 7 and in some embodiments about 5.

The smaller the focal number FN the larger or steeper the focal angle A of the laser beam 16. The focal angle A is a half angle of the angle of a cone defined by the outer conical surface of the laser beam. Plumes emanate or erupt from the plasma and shock waves generated by the laser shock peening of the laser shock peening surface 11 of the article being laser shock peened. A low focal number FN and, corresponding steep focal angle A results in a reduction in length of the plume that is created before the laser beam reaches its focal point or the laser shock peening surface 11. Plumes are very susceptible to mist ionization and, therefore, by reducing the focal number FN, the likelihood of ionization is also reduced.

In one example the aperture 26 is about one eighth of an inch wide and the lens 30 is about four inches wide. A four inch wide lens having a focal number FN=9.85 and a focal length FL=1 meter, and a focal angle A=2.9 degrees, produces a plume having a plume length=0.748 inches. A four inch wide lens having a focal number FN=7.4 and a focal length FL=0.75 meter, and a focal angle A=3.88 degrees, produces a plume having a plume length=0.561 inches. Thus reducing the focal length by 25 percent also reduces the plume length by 25 percent. These numbers in this example are based on empiracle data measured in tests.

Figure 2:
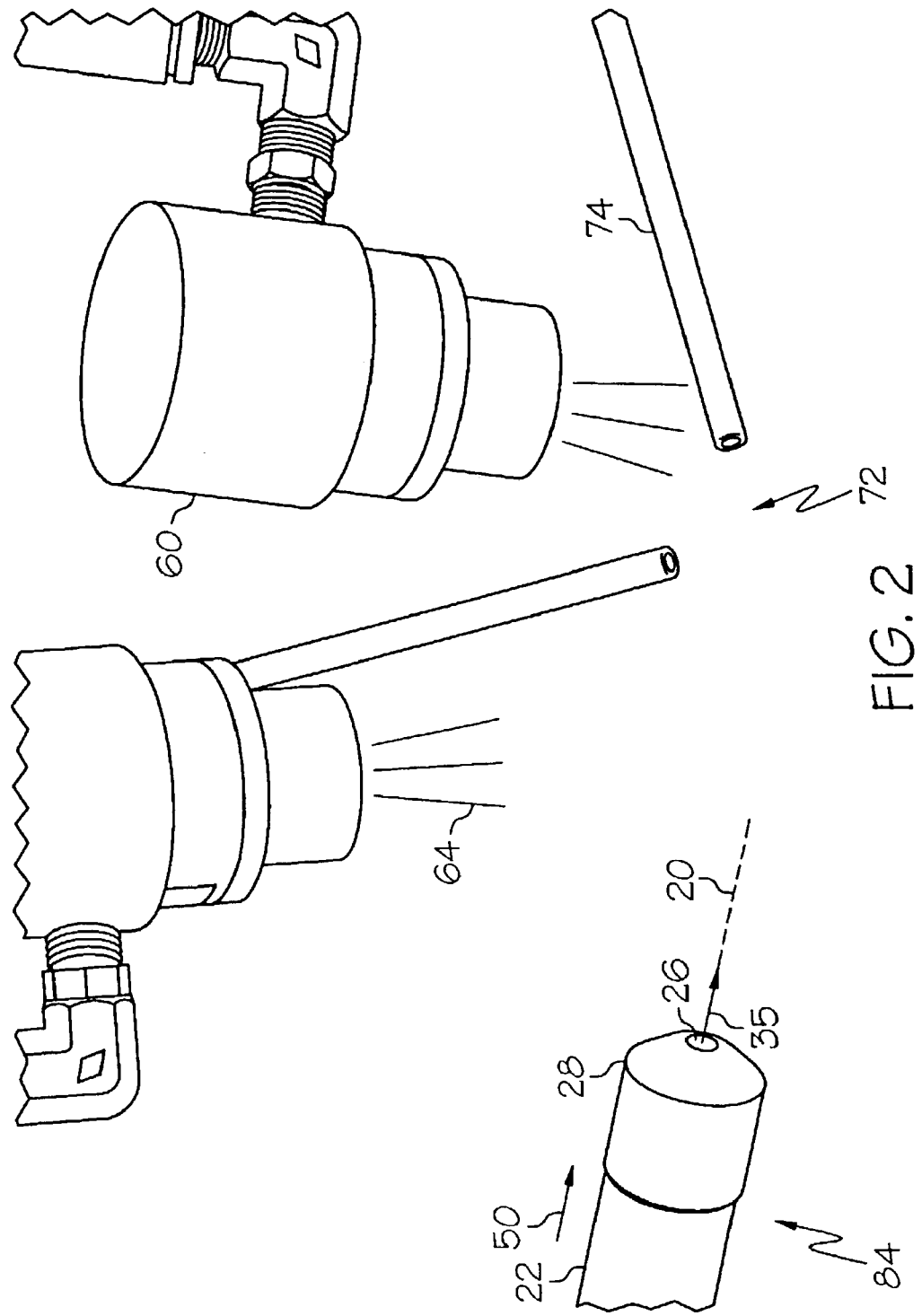
FIG. 2 is an enlarged view of a laser tube aperture and gas knives in the laser shock peening chamber illustrated in FIG. 1.

The exemplary embodiment of the apparatus 10 further includes a gas knife 60 located between the aperture 26 and the focal point FP of the lens 30 as illustrated in FIGS. 1 and 2. The gas knife 60 is used for flowing a large volume of clearing gas 64 across the laser beam between the aperture and the focal point. The fluid nozzle 74 is located proximate to and directed towards the laser shock peening area 72. The water from the fluid nozzle 74 is caught in a drain catch 76 located within the enclosure 70 under the laser shock peening area 72. A fluid receptacle 80, such as a tank, is located outside the enclosure 70 and a vacuum line 82 leads from the drain catch 76 to the fluid receptacle 80 for draining liquid runoff from the fluid nozzle 74 in the open drain catch 76 into the fluid receptacle 80. A source of vacuum is located between the open drain catch 76 and the fluid receptacle 80. The fluid receptacle 80 may be maintained at a lower pressure than ambient within the enclosure 70. This helps reduce moisture and mist in the cell and enclosure 70 which in turn reduces mist ionization and ionization of the laser beam before it reaches the work piece. This in turn prevents successive laser beam shots to bloom which interferes with the laser shock peening process and, thus, the reduction of mist and ionization reduces or eliminates loss of efficacy of each successive laser beam shot.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A laser shock peening apparatus comprising: a laser unit having a laser beam source for generating a laser beam along a beam centerline,
   a beam tube surrounding at least a portion of the beam centerline, and
   a beam aperture located at an exit of the beam tube.

2. An apparatus as claimed in claim 1 further comprising a final beam optical lens mounted within the tube upstream of the aperture.

3. An apparatus as claimed in claim 2 further comprising a gas purging means for flowing a purge gas into the tube between the final beam optical lens and the aperture.

4. An apparatus as claimed in claim 3 wherein the gas purging means includes a purge gas inlet disposed though the tube between the final beam optical lens and the aperture and a purge gas supply hooked up to the purge gas inlet.

5. An apparatus as claimed in claim 3 wherein the purge gas is air.

6. An apparatus as claimed in claim 3 wherein the purge gas is Nitrogen.

7. An apparatus as claimed in claim 3 further comprising a converging section of the tube located between the final beam optical lens and the aperture wherein the tube converges in a direction from the final beam optical lens towards the aperture.

8. An apparatus as claimed in claim 7 further comprising at least one telescoping section in the tube between the final beam optical lens and the aperture.

9. An apparatus as claimed in claim 8 wherein the telescoping section is in the converging section.

10. An apparatus as claimed in claim 7 wherein the gas purging means includes a purge gas inlet disposed through the tube between the final beam optical lens and the aperture and a purge gas supply hooked up to the purge gas inlet.

11. An apparatus as claimed in claim 7 wherein the purge gas is air.

12. An apparatus as claimed in claim 7 wherein the purge gas is Nitrogen.

13. An apparatus as claimed in claim 2 further comprising:
   the final beam optical lens having a focal number less than 8,
   the focal number being defined as a ratio of a focal length of the lens to a diameter of the lens, and
   the lens having a focal point located past the beam aperture outside of the beam tube.

14. An apparatus as claimed in claim 13 wherein the focal number less than 7.

15. An apparatus as claimed in claim 14 wherein the focal number is about 5.

16. An apparatus as claimed in claim 15 further comprising a gas purging means for flowing a purge gas into the tube between the final beam optical lens and the aperture.

17. An apparatus as claimed in claim 16 wherein the gas purging means includes a purge gas inlet disposed through the tube between the final beam optical lens and the aperture and a purge gas supply hooked up to the purge gas inlet.

18. An apparatus as claimed in claim 16 wherein the purge gas is air.

19. An apparatus as claimed in claim 16 wherein the purge gas is Nitrogen.

20. An apparatus as claimed in claim 16 further comprising a converging section of the tube located between the final beam optical lens and the aperture wherein the tube converges in a direction from the final beam optical lens towards the aperture.

21. An apparatus as claimed in claim 20 further comprising at least one telescoping section in the tube between the final beam optical lens and the aperture.

22. An apparatus as claimed in claim 21 wherein the telescoping section is in the converging section.

23. An apparatus as claimed in claim 20 wherein the gas purging means includes a purge gas inlet disposed through the tube between the final beam optical lens and the aperture and a purge gas supply hooked up to the purge gas inlet.

24. An apparatus as claimed in claim 20 wherein the purge gas is air.

25. An apparatus as claimed in claim 24 wherein the purge gas is Nitrogen.

26. An apparatus as claimed in claim 2 further comprising a gas knife located between the aperture and a focal point of the lens, the gas knife being effective for flowing a large volume of clearing gas across the laser beam between the aperture and the focal point.

27. An apparatus as claimed in claim 26 further comprising a gas purging means for flowing a purge gas into the tube between the final beam optical lens and the aperture.

28. An apparatus as claimed in claim 27 wherein the gas purging means includes a purge gas inlet disposed though the tube between the final beam optical lens and the aperture and a purge gas supply hooked up to the purge gas inlet.

29. An apparatus as claimed in claim 28 further comprising a converging section of the tube located between the final beam optical lens and the aperture wherein the tube converges in a direction from the final beam optical lens towards the aperture.

30. An apparatus as claimed in claim 29 further comprising at least one telescoping section in the tube between the final beam optical lens and the aperture.

31. An apparatus as claimed in claim 30 wherein the telescoping section is in the converging section.

32. A laser shock peening cell comprising:
   an enclosure and a laser shock peening area within the enclosure, a laser unit having a laser beam source for generating a laser beam along a beam centerline across the laser shock peening area, a beam tube surrounding at least a portion of the beam centerline and extending at least partially into the enclosure, a beam aperture located at an exit of the beam tube proximate the laser shock peening area, a final beam optical lens mounted within the tube upstream of the aperture, a fluid nozzle directed towards the laser shock peening area, a drain catch located within the enclosure under the laser shock peening area, a fluid receptacle located outside the enclosure, and a vacuum line between the drain catch and the fluid receptacle.

33. An apparatus as claimed in claim 32 further comprising a gas purging means for flowing a purge gas into the tube between the final beam optical lens and the aperture.

34. An apparatus as claimed in claim 33 wherein the gas purging means includes a purge gas inlet disposed though the tube between the final beam optical lens and the aperture and a purge gas supply hooked up to the purge gas inlet.

35. An apparatus as claimed in claim 33 wherein the purge gas is air.

36. An apparatus as claimed in claim 33 wherein the purge gas is Nitrogen.

37. An apparatus as claimed in claim 33 further comprising a converging section of the tube located between the final beam optical lens and the aperture wherein the tube converges in a direction from the final beam optical lens towards the aperture.

38. An apparatus as claimed in claim 37 further comprising at least one telescoping section in the tube between the final beam optical lens and the aperture.

39. An apparatus as claimed in claim 38 wherein the telescoping section is in the converging section.

40. An apparatus as claimed in claim 32 further comprising:

the final beam optical lens having a focal number less than 8, the focal number being defined as a ratio of a focal length of the lens to a diameter of the lens, and the lens having a focal point located past the beam aperture outside of the beam tube.

41. An apparatus as claimed in claim 40 wherein the focal number less than 7.

42. An apparatus as claimed in claim 41 wherein the focal number is about 5.

43. An apparatus as claimed in claim 40 further comprising a gas purging means for flowing a purge gas into the tube between the final beam optical lens and the aperture.

44. An apparatus as claimed in claim 43 further comprising a converging section of the tube located between the final beam optical lens and the aperture wherein the tube converges in a direction from the final beam optical lens towards the aperture.

45. An apparatus as claimed in claim 44 further comprising at least one telescoping section in the tube between the final beam optical lens and the aperture.

46. An apparatus as claimed in claim 45 wherein the telescoping section is in the converging section.

47. An apparatus as claimed in claim 46 wherein the gas purging means includes a purge gas inlet disposed through the tube between the final beam optical lens and the aperture and a purge gas supply hooked up to the purge gas inlet.

48. An apparatus as claimed in claim 47 wherein the purge gas is air.

49. An apparatus as claimed in claim 48 wherein the purge gas is Nitrogen.

50. An apparatus as claimed in claim 46 further comprising a gas knife located between the aperture and a focal point of the lens, the gas knife being effective for flowing a large volume of clearing gas across the laser beam between the aperture and the focal point.

51. An apparatus as claimed in claim 50 further comprising a gas purging means for flowing a purge gas into the tube between the final beam optical lens and the aperture.

52. An apparatus as claimed in claim 51 wherein the gas purging means includes a purge gas inlet disposed though the tube between the final beam optical lens and the aperture and a purge gas supply hooked up to the purge gas inlet.

53. An apparatus as claimed in claim 51 further comprising a converging section of the tube located between the final beam optical lens and the aperture wherein the tube converges in a direction from the final beam optical lens towards the aperture.

54. An apparatus as claimed in claim 53 further comprising at least one telescoping section in the tube between the final beam optical lens and the aperture.

55. An apparatus as claimed in claim 54 wherein the telescoping section is in the converging section.

* * * * *